(12) United States Patent
Zheng

(10) Patent No.: US 6,485,190 B1
(45) Date of Patent: Nov. 26, 2002

(54) COMPACT, LOW COST IN-LINE MICRO-OPTIC COMPONENTS MADE WITH SIMPLIFIED SOLDERING CONFIGURATION AND METHOD

(75) Inventor: Yu Zheng, Sunnyvale, CA (US)

(73) Assignee: JDS Uniphase Inc., Ontario (CA)

( * ) Notice: Subject to any disclaimer, the term of this patent is extended or adjusted under 35 U.S.C. 154(b) by 0 days.

(21) Appl. No.: 09/315,364

(22) Filed: May 18, 1999

(51) Int. Cl.[7] ............................................. G02B 6/38
(52) U.S. Cl. ......................... 385/61; 385/51; 385/52; 385/139; 385/147
(58) Field of Search ........................ 385/11, 14, 31–35, 385/16, 24, 123, 130, 139, 88–94, 61, 75, 76, 79, 80, 147, 15, 27, 18; 250/227.19, 227.14; 324/96, 244.1, 117 R, 750, 753

(56) References Cited

U.S. PATENT DOCUMENTS

| | | | | |
|---|---|---|---|---|
| 5,661,829 A | * | 8/1997 | Zheng | 385/33 |
| 5,734,762 A | * | 3/1998 | Ho et al. | 385/11 |
| 5,838,847 A | * | 11/1998 | Pan et al. | 385/18 |
| 6,118,912 A | * | 9/2000 | Xu | 385/24 |
| 6,123,465 A | * | 9/2000 | Hashizume | 385/93 |
| 6,232,763 B1 | * | 5/2001 | Itoh | 324/96 |
| 6,304,687 B1 | * | 10/2001 | Inoue et al. | 385/14 |

* cited by examiner

Primary Examiner—F. L. Evans
Assistant Examiner—Michael P. Mooney
(74) Attorney, Agent, or Firm—Bo-In Lin

(57) ABSTRACT

The present invention discloses an improved in-line micro-optic component. The in-line micro-optic component includes an optical core attached to a first optical collimator by applying a first heat-curing epoxy. The in-line micro-optic component further includes a first gold-plated stainless steel holder holding the first optical collimator. The first optical collimator is inserted and fixed in the first stainless steel holder by applying a second heat-curing epoxy. The inline micro-optic component coupler further includes a second optical collimator. The in-line micro-optic component coupler further includes a second gold-plated stainless steel holder holding the second optical collimator. The second optical collimator is inserted and fixed in the second stainless steel holder by applying a third heat-curing epoxy. After the optical alignment between the first optical collimator with the optical core and the second optical collimator is done to achieve a lowest transmission loss, the first and the second stainless steel holders are soldered together.

23 Claims, 4 Drawing Sheets

COMPACT, LOW COST IN-LINE MICRO-OPTIC COMPONENTS MADE WITH SIMPLIFIED SOLDERING CONFIGURATION AND METHOD

FIELD OF THE INVENTION

This invention relates generally to a method and system for use in optical fiber technology. More particularly, this invention relates to an improved soldering method and system for manufacturing in-line micro-optic components.

BACKGROUND OF THE INVENTION

In-line micro-optic component, such as isolators, gain flattening filters, wavelength division multiplexed (WDM) couplers, hybrid isolators and circulators, have been being widely employed in optical fiber technology. The performance, reliability and cost of the in-line micro-optic components depend heavily on their design and packaging technologies. Currently, two major kinds of design and packaging technologies are being widely employed in manufacturing the in-line micro-optic components and each kind has its own advantages and disadvantages. In applying a first kind of technology for designing and packaging the in-line micro-optic components, all optical parts are bonded together by applying epoxy bonding. The present inventor has filed several patent applications with new structural configurations and manufacturing methods for improving the in-line micro-optic components made by this first kind of technology using epoxy. In applying a second kind of technology for designing and packaging the in-line micro-optic components, both epoxy and solder bonding are applied to bond optical paths together. In the present invention, improvements over this second kind of technology are disclosed.

FIG. 1 is a cross sectional view to show the structure of a typical in-line micro-optic component manufactured according to the second kind of technology employing both epoxy and soldering. The in-line micro-optic component includes a pair of optical collimators 10 and 15. The pair of optical collimators can be a pair of single fiber optical collimators in the case of isolators and gain-flattening filters or a pair of a single fiber optical collimator and a dual fiber optical collimator in the case of WDM couplers and hybrid isolators. For the purpose of illustration, FIG. 1 shows a cross section view of a pair of single fiber optical collimators. The in-line micro-optic component further includes an optical core 20 attached to one of the optical collimators, i.e., the optical collimator 10 in FIG. 1, by applying a heat-curing epoxy 25. The optical core 20 has different inside structure and function for different in-line micro-optic components. For an example, in the case of isolators, the optical core is made of a Faraday rotator, two polarizers and a magnet, and will allow the transmission of optical signals in a direction while blocking the transmission of optical signals in the reverse direction. For another example, in the case of WDM couplers, the optical core is made of a thin-film interference filter and win combine or separate optical signals having different wavelengths. According to the conventional design and technology commonly applied, the pair of the optical collimators 10 and 15 with the optical core 20 are soldered together by using gold-plated stainless tubes. The optical collimator 10 with the optical core 20 and the optical collimator 15 are separately inserted and fixed into gold-plated stainless steel holders 30 and 35 by applying heat-curing epoxies 40 and 45. An optical alignment is carried out between the optical collimators 10 with the optical core 20 and the optical collimator 15 to achieve a lowest transmission loss from the input fiber 50 to the output fiber 55. These optical parts are soldered together through a gold-plated stainless steel holder 60 by applying a solder 65.

The conventional soldering method and system provides the in-line micro-optic components with good performance and reliability suitable for many types of applications. However, the conventional in-line micro-optic components have some disadvantages. First, in order to solder the optical collimators 10 with the optical core 20 and the optical collimator 15 together, three gold-plated stainless steel holders 30, 35 and 60 are needed. These three holders 30, 35 and 60, especially the holder 60, are produced at a relatively high price. Thus, the costs spent on these holders according to the structure and manufacturing method of the conventional in-line micro-optic components are high. Secondly, as shown by FIG. 1, there are ten soldering points for manufacturing an in-line micro-optic component according to the conventional soldering method and system. Soldering strength between these ten soldering points must be balanced to achieve a lowest transmission loss and the soldering process according to the conventional soldering method and system is complicated and time-consuming. Thus the labor costs of the conventional in-line micro-optic components are also high. Thirdly, while optical system designers and operators prefer to have compact in-line micro-optic components, the sizes of the conventional in-line micro-optic components cannot be made compact due to the limited size of the holder 60. Thus, further development of compact low-cost in-line micro-optic components is limited by these difficulties.

Therefore, a need still exists in the art of design and packaging of the in-line micro-optic components to provide improved material compositions, soldering configuration, device structure, and manufacturing processes to overcome the difficulties discussed above. Specifically, a technique to provide the in-line micro-optic component with compact size and low cost is required.

SUMMARY OF THE PRESENT INVENTION

It is therefore an object of the present invention to provide an improved design and process for fabricating an in-line micro-optic component without requiring an outer holder and multiple soldering points. This present invention provides a simplified in-line micro-optic component configuration that can be manufactured with lower cost and reduced size. Thus, the aforementioned difficulties and limitations in the prior art can be overcome.

Specifically, it is an object of the present invention to provide a design and process to solder the in-line micro-optic components together by employing only the inner holders without requiring an additional outer holder commonly used in the conventional in-line micro-optic component manufacturing processes. Two gold-plated stainless steel holders are used in the soldering process to lower the cost and reduce the size by eliminating the requirement of a third, expensive holder. As a result, the in-line micro-optic components produced according to the new soldering method and system of this invention have lower cost and smaller size. Therefore, the in-line micro-optic components of this invention can be employed in fiber optic technology for broadened applications with being less limited by the cost and size problems of the in-line micro-optic components as those encountered in the prior art.

Briefly, in a preferred embodiment, the present invention discloses an in-line micro-optic component. The in-line micro-optic component includes an optical core attached to a first optical collimator by applying a first heat-curing epoxy. The in-line micro-optic component further a first gold-plated stainless steel holder holding the first optical collimator. The first optical collimator is inserted and fixed in the first stainless steel holder by applying a second heat-curing epoxy. The in-line micro-optic component coupler further includes a second optical collimator. The in-line micro-optic component coupler further includes a second gold-plated stainless steel holder holding the second optical collimator. The second optical collimator is inserted and fixed in the second stainless steel holder by applying a third heat-curing epoxy. After the optical alignment between the first optical collimator with the optical core and the second optical collimator is done to achieve a lowest transmission loss, the first and second stainless steel holders are soldered together.

The present invention further discloses a method for fabricating an in-line micro-optic component. The method includes the steps of: a) attaching an optical core to a first optical collimator by applying a first heat-curing epoxy; b) inserting and fixing the first optical collimator with the optical core into a first gold-plated stainless steel holder by applying a second heat-curing epoxy; c) inserting and fixing a second optical collimator into a second gold-plated stainless steel holder by applying a third heat-curing epoxy; d) mounting the first optical collimator with the optical core and the second optical collimator on an alignment stage then adjusting a relative position of the first optical collimator with the optical core to the second optical collimator until a lowest transmission loss is achieved; and e) soldering the first and second stainless steel holders together.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

The present invention discloses a simplified and improved in-line micro-optic component of this invention that includes major parts of the optical collimators, the optical core and the gold-plated stainless steel holders. While the optical core is fixed to the optical collimator and the optical collimators are fixed into the gold-plated stainless steel holders by applying heat-curing epoxies, the optical collimators are soldered together. The optical collimators held in separated inner holders are soldered together directly without using an additional outer holder that requires multiple soldering operations that is complicate and time-consuming as that commonly implemented in the prior art.

Figure 1:
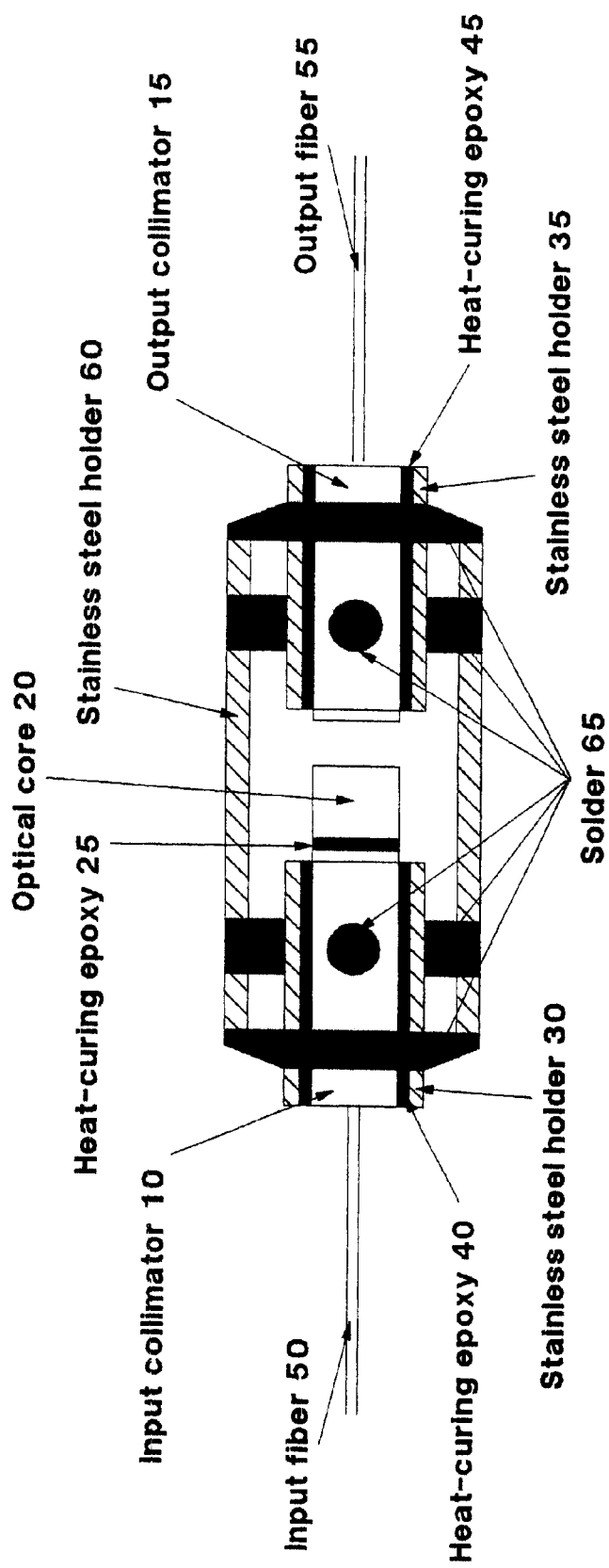
FIG. 1 is a cross sectional view of the in-line micro-optic component made according to the conventional soldering method and system.
Figures 2, 2A:
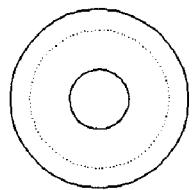
FIG. 2A is cross sectional views of the first stainless steel holder used in this invention.
Figures 1, 2A:
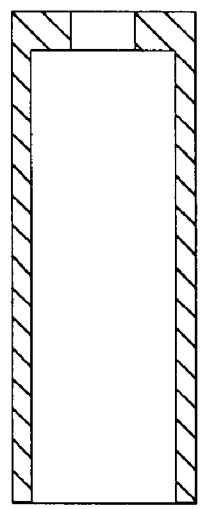
Figures 2, 2B:
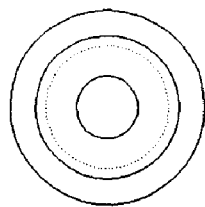
FIG. 2B is cross sectional views of the second stainless steel holder used in this invention.
Figures 1, 2B:
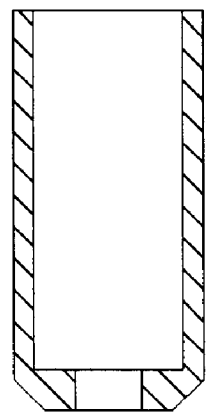
Figure 2C:
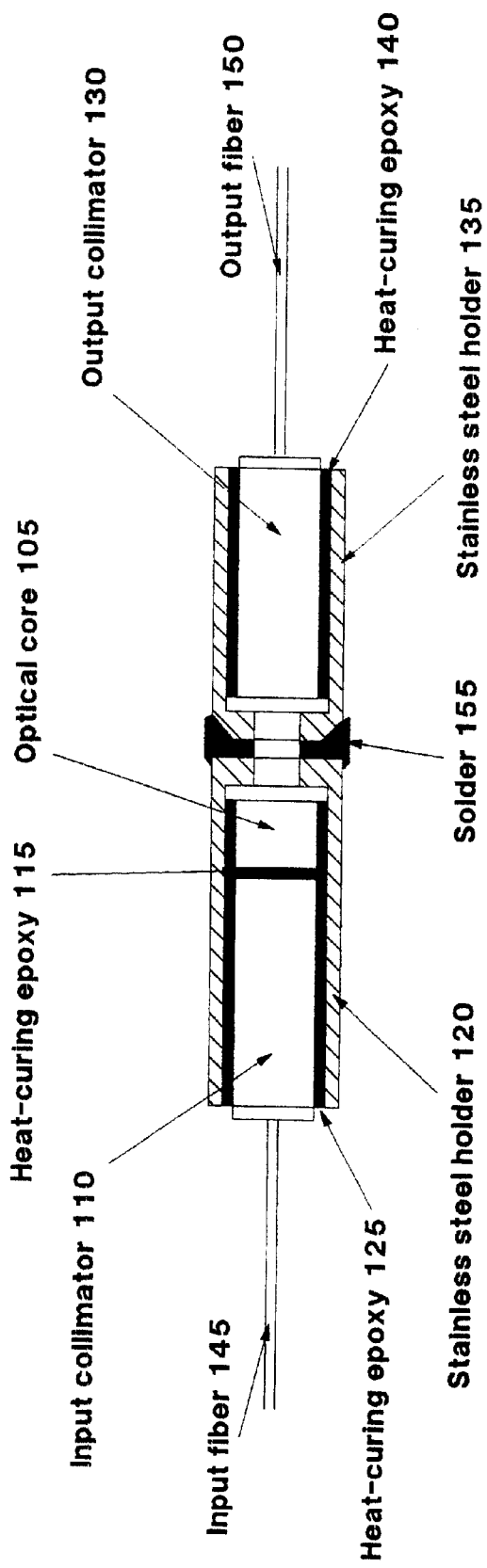
FIG. 2C is the cross sectional view of the finally assembled in-line micro-optic component of this invention.

Please refer to FIGS. 2A to 2C for discussion of the materials and the fabrication processes employed to provide an improved in-line micro-optic component 100 of this invention. An optical core 105 is attached to a first optical collimator 110 by applying a first heat-curing epoxy 115. Then the first optical collimator 110 with the optical core 105 is inserted and fixed into a first gold-plated stainless steel holder 120 by applying a second heat-curing epoxy 125. FIGS. 2A-1 and 2A-2 show respectively the side and front cross sectional views of the first stainless steel holder 120. The soldering is to be applied to the right-side front end surface of the first stainless steel holder 120. In order to achieve stronger soldering strength, the first stainless steel holder 120 has a smaller inside diameter at the right side which provides more soldering areas at the front end surface. The front end on the right side of the stainless steel holder 120 also leaves sufficient opening in the center thus not affecting the transmission of optical signals. Then a second optical collimator 130 is inserted and fixed into a second gold-plated stainless steel holder 135 by applying a third heat-curing epoxy 140. FIGS. 2B-1 and 2B-2 show respectively the side and front cross sectional views of the second stainless steel holder 135. The soldering is to be applied to the left-side front end surface of the second stainless steel holder 135. Like the first stainless steel holder 120, in order to achieve stronger soldering strength, the second stainless steel holder 135 also has a smaller inside diameter at the left side which provides more soldering areas at the front end surface. Again, the front end on the left side of the second stainless steel holder 135 leaves sufficient opening in the center thus not affecting the transmission of optical signals. Furthermore, in order to make the soldering process easy, the left-side front end surface of the second stainless steel holder 135 has the tapered outside corner with a slant angle of approximately forty-five degrees. The first optical collimator 110 with the optical core 105 and the second optical collimator 130 are mounted on an alignment stage (not shown), a relative position of the first optical collimator 110 with the optical core 105 to the second optical collimator 130 is adjusted. The adjustment is to achieve a lowest transmission loss from the input fiber 145 to the output fiber 150. After the optical collimators 110 and 130 are placed at their optimal position relative to each other, a solder 155 is applied to solder the stainless steel holders 120 and 135 together. The soldering process is conducted between the right-side front end surface of the first stainless steel holder 120 and the left-side front end surface of the second stainless steel holder 135. FIG. 2C shows the finally assembled in-line micro-optic component according to this invention. As compared to the conventional in-line micro-optic component as shown in FIG. 1, there is only one soldering area in the present invention. While the soldering strength in the present invention has been qualified to be strong enough to pass requirements of most applications, the soldering process of this present invention is much simpler and thus less time-consuming as compared to the conventional soldering method and system. Therefore, the material and labor costs of the in-line micro-optic components of the present invention have been reduced as compared to those of the conventional ones.

In the present invention, the lengths of the stainless steel holders 120 and 135 are chosen as about 15 mm and 11 mm, respectively. While the left-side inside diameter of the first stainless steel holder 120 and the right-side inside diameter of the second stainless steel holder 135 are chosen to match with the outside diameters of the optical collimators 110 and 130, i.e., about 2.8 mm, the right-side inside diameter of the first stainless steel holder 120 and the left-side inside diameter of the second stainless steel holder 135 are chosen to be about 1.5 mm. The outside diameters of the first and second stainless steel holders 120 and 135 are chosen to be about 3.5 mm. The left-side corner angle of the second stainless steel holder 135 is chosen to be about forty-five degrees. In a preferred embodiment, the solder 155 is a low-cost standard Sn63Fb37 solder alloy.

According to FIGS. 2A to 2C and the above description, this present invention discloses an in-line micro-optic component. The in-line micro-optic component includes an optical core attached to an input collimator via a first epoxy. The device further includes a first holder holding and securely bonding to the input collimator and the optical core with a second epoxy. The device further includes a second holder holding and securely bonding to an output collimator via a third epoxy. The first holder is disposed at an optimal position and gap away from the second holder for achieving a minimal transmission loss. And, the device further includes a soldering joint disposed between the first and second holders maintaining the optimal position and securely bonding the first and second holders together. In a preferred embodiment, the first, second and third epoxies are a 353ND heat-curing epoxy from Epoxy Technology Inc. located in. In another preferred embodiment, the first and second holders are a first and a second gold-plated stainless steel holders. In another preferred embodiment, the soldering joint is a solder joint formed with a solder alloy which melting point temperature ranges from 140 to 200 C. In another preferred embodiment, the soldering joint is a solder joint formed with a SnPb-based solder alloy. In another preferred embodiment, the first holder having a first end surface near the optical core formed with a first soldering-enhancement end surface for disposing the solder joint for securely attaching the first holder to the second holder. And, the second holder is formed with a second soldering-enhancement end surface near the first holder for disposing the solder joint for securely attaching the first holder to the second holder. In anther preferred embodiment, the first soldering-enhancement end surface comprising an inward extending end surface extended toward a center of the first holder for providing an extended end-surface area for soldering enhancement and maintaining an optical path opening near the center of the first holder. And, the second soldering-enhancement end surface comprising an inward extending end surface extended toward a center of the first holder for providing an extended end-surface area for soldering enhancement and maintaining an optical path opening near the center of the second holder. In another preferred embodiment, the second soldering-enhancement end surface further includes a tapered corner with a slop upper surface above the extending end surface for enhancing a melted solder alloy to flow to a space between the first and second soldering-enhancement end surfaces. In a specific embodiment, the tapered corner with a slop upper surface above the extending end surface is a slop upper surface having a tapered angle of about forty-five degrees. In another specific embodiment, the first holder having a length of about 5 to 20 mm, an inside diameter of about 1.5 to 3.0 mm and an outside diameter of about 2.5 to 4.0 mm. And, the second holder having a length of about 5 to 20 mm, an inside diameter of about 1.0 to 3.0 mm and an outside diameter of about 2.5 to 4.0 mm.

According to FIGS. 2A to 2C and the above descriptions, this invention further discloses a method for fabricating an in-line optical device. The method includes the steps of: a) attaching an optical core to an input collimator by applying a first heat-curing epoxy; b) inserting and fixing the input collimator attached to the optical core into a first holder by applying a second heat-curing epoxy; c) inserting an output collimator into a second holder and fixing the output collimator in the second holder by applying a third heat-curing epoxy; d) mounting the first holder holding the input collimator and the second holder holding the output collimator and adjusting a relative position between the output collimator to the optical core to achieve a minimal transmission loss; and e) soldering and securely attaching the first holder to the second holder maintaining the relative position between the output collimator to the optical core. In a preferred embodiment, the steps of applying the first, second, and third heat-curing epoxies are steps of applying a 353ND heat-curing epoxy. In another preferred embodiment, the steps of inserting the input and output collimators into the first and second holders are steps of inserting the first and second gold-plated stainless steel holders. In another preferred embodiment, the steps of soldering the first holder to the second holder is a step of applying a solder alloy which melting point temperature ranges from 140 to 200 C. In another preferred embodiment, the steps of soldering the first holder to the second holder is a step of applying a SnPb-based solder alloy. In another preferred embodiment, the step b) of inserting and fixing the input collimator attached to the optical core into the first holder is a step of inserting into a first holder having the first end surface near the optical core formed with a soldering enhancement end surface for enhancing the step e) of soldering the first holder to the second holder. In another preferred embodiment, the step c) of inserting and fixing the output collimator into the second holder is a step of inserting into a second holder formed with a soldering-enhancement end surface for enhancing the step e) of soldering the first holder to the second holder. In another preferred embodiment, the step of inserting into the first holder formed with a soldering-enhancement end surface is a step of inserting into the first holder having an inward extending end surface extended toward a center of the first holder for providing an extended end-surface area for soldering enhancement and maintaining an optical path opening near the center of the first holder. In another preferred embodiment, the step of inserting into the second holder formed with a soldering-enhancement end surface is a step of inserting into the second holder having an inward extending end surface extended toward a center of the second holder for providing an extended end-surface area for soldering enhancement and maintaining an optical path opening near the center of the second holder. In another preferred embodiment, the step of inserting into the first holder formed with a soldering-enhancement end surface further includes a step of forming the second holder having a tapered corner with a slop upper surface above the extending end surface for enhancing a melted solder alloy to flow to the soldering-enhancement end surface. In another preferred embodiment, the step of forming the second holder having a tapered corner with a slop upper surface above the extending end surface is a step of forming the slop upper surface above the extending end surface having a tapered angle of about forty-five degrees. In a specific embodiment, the step b) of inserting into the first holder is a step of inserting into a first holder having a length of about 5 to 20 mm, an inside diameter of about 1.5 to 3.0 mm and an outside diameter of about 2.5 to 4.0 mm. In another specific embodiment, the step c) of inserting into the second holder is a step of inserting into a second holder having a length of about 5 to 20 mm, an inside diameter of about 1.0 to 3.0 mm and an outside diameter of about 2.5 to 4.0 mm.

In summary, this invention discloses an in-line optical device includes a plurality of optical parts for processing an optical signal transmission therein. The optical device includes a plurality of holders holding and securely bonding to the plurality of optical parts and the holders are adjusted to be disposed with an optimal position and gap from a next holder for minimum transmission loss. The optical device further includes a soldering joint disposed in each of the optimal gap for soldering and securely bonding the holders together. In a specific embodiment, the holders are gold-plated stainless steel holders. In another specific embodiment, the device further includes an epoxy disposed between the holders and the plurality of optical parts for securely bonding the optical parts to the holders. In a specific embodiment, the soldering joint is a solder joint formed with a solder alloy which melting point temperature ranges from 140 to 200 C. In a specific embodiment, the soldering joint is a solder joint formed with a SnPb-based solder alloy. In another embodiment, each of the holders having a soldering-enhancement end surface for disposing the solder joint for securely attaching the holders together. In a specific embodiment, the soldering-enhancement end surface comprising an inward extending end surface extended toward a center of the holders for providing an extended end-surface area for soldering enhancement and maintaining an optical path opening near the center of the holders. In another specific embodiment, the soldering-enhancement end surface on one of two adjacent holders further includes a tapered corner with a slop upper surface above the extending end surface for enhancing a melted solder alloy to flow to the soldering-enhancement end surface. In another specific embodiment, the tapered corner with a slop upper surface above the extending end surface on one of the two adjacent holders having a slop upper surface with a tapered angle of about forty-five degrees above the extending end surface. In anther specific embodiment, the holders have a length of about 5 to 20 mm, an inside diameter of about 1.0 to 3.0 mm and an outside diameter of about 2.5 to 4.0 mm.

Therefore, the present invention discloses an improved design and process for fabricating an in-line micro-optic component without requiring an outer holder. The requirement for performing a multiple-point soldering operation is eliminated. A simplified in-line micro-optic component configuration is disclosed that can be manufactured with lower cost and reduced size. Thus, with the new and improved in-line micro-optic components of this invention, the difficulties and limitations in the prior art can be overcome. Specifically, this invention discloses a design and process to solder the in-line micro-optic components together by a soldering attachment involving only the inner holders without requiring an additional outer holder commonly used in the conventional in-line micro-optic component manufacturing processes. Two gold-plated stainless steel holders are used in the soldering process to lower the cost and reduce the size by eliminating the requirement of a third holder. As a result, the in-line micro-optic components produced according to the new soldering method and system of this invention have lower cost and smaller size. Therefore, the in-line micro-optic components of this invention can be employed in fiber optic technology for broadened applications with being less limited by the cost and size problems of the in-line micro-optic components as those encountered in the prior art.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. An in-line micro-optic device comprising:

an input collimator attached to an optical core via a first epoxy;

a first holder holding and securely bonding to said input collimator and said optical core with a second epoxy;

a second holder holding and securely bonding to an output collimator via a third epoxy;

said first holder disposed at an optimal position and gap away from said second holder for achieving a minimal transmission loss; and a soldering joint disposed between said first and second holders maintaining said optimal distance and securely bonding said first and second holders together.

2. The in-line micro-optic device of claim 1 wherein:

said first, second and third epoxies are a 353ND epoxy.

3. The in-line micro-optic device of claim 1 wherein:

said first and second holders are a first and a second gold-plated stainless steel holders.

4. The in-line micro-optic device of claim 1 wherein:

said soldering joint is a solder joint formed with a solder alloy which melting point temperature ranges from 140 to 200 C.

5. The in-line micro-optic device of claim 1 wherein:

said soldering joint is a solder joint formed with a SnPb-based solder alloy.

6. The in-line micro-optic device of claim 1 wherein:

said first holder having a first end surface near said optical core formed with a first soldering-enhancement end surface for disposing said solder joint for securely attaching said first holder to said second holder.

7. The in-line optical device of claim 1 wherein:

said second holder is formed with a second soldering-enhancement end surface near said first holder for disposing said solder joint for securely attaching said first holder to said second holder.

8. The in-line micro-optic device of claim 6 wherein:

said first soldering-enhancement end surface comprising an inward extending end surface extended toward a center of said first holder for providing an extended end-surface area for soldering enhancement and maintaining an optical path opening near said center of said first holder.

9. The in-line micro-optic device of claim 7 wherein:

said second soldering-enhancement end surface comprising an inward extending end surface extended toward a center of said first holder for providing an extended end-surface area for soldering enhancement and maintaining an optical path opening near said center of said second holder.

10. The in-line optical device of claim 8 wherein:

said second soldering-enhancement end surface further includes a tapered corner with a slop upper surface above said extending end surface for enhancing a melted solder alloy to flow to a space between said first and second soldering-enhancement end surfaces.

11. The in-line optical device of claim 10 wherein:

said tapered corner with a slop upper surface above said extending end surface is a slop upper surface having a tapered angle of about forty-five degrees.

12. The in-line micro-optic device of claim 1 wherein:
said first holder having a length of about 5 to 20 mm, an inside diameter of about 1.5 to 3.0 mm and an outside diameter of about 2.5 to 4.0 mm.

13. The in-line optical device of claim 1 wherein:
said second holder having a length of about 5 to 20 mm, an inside diameter of about 1.0 to 3.0 mm and an outside diameter of about 2.5 to 4.0 mm.

14. An in-line micro-optic device includes a plurality of optical parts for processing an optical signal transmission therein; comprising
a plurality of holders holding and securely bonding to said plurality of optical parts and said holders are spaced from an adjacent holder by an optimal gap for minimum transmission loss;
a soldering joint disposed in each of said optimal gap for soldering and securely bonding said holders together.

15. The in-line micro-optic device of claim 14 wherein:
said holders separated by said optimal gaps are gold-plated stainless steel holders.

16. The in-line micro-optic device of claim 14 further comprising:
an epoxy disposed between an inside wall of said holders and said plurality of optical parts for securely bonding said optical parts to said holders.

17. The in-line micro-optic device of claim 14 wherein:
said soldering joint disposed in said optimal gap separating said holders is a solder joint formed with a solder alloy which melting point temperature ranges from 140 to 200 C.

18. The in-line micro-optic device of claim 14 wherein:
said soldering joint disposed in said optimal gap separating said holders is a solder joint formed with a SnPb-based solder alloy.

19. An in-line micro-optic device includes a plurality of optical parts for processing an optical signal transmission therein; comprising:
a plurality of holders holding and securely bonding to said plurality of optical parts and said holders are spaced from an adjacent holder by an optimal gap for minimum transmission loss;
a soldering joint disposed in each of said optimal gap for soldering and securely bonding said holders together;
each said holders having a soldering-enhancement end surface for disposing said solder joint for securely attaching said holders together.

20. The in-line micro-optic device of claim 19 wherein:
said soldering-enhancement end surface comprising an inward extending end surface extended toward a center of said holders for providing an extended end-surface area for soldering enhancement and maintaining an optical path opening near said center of said holders.

21. The in-line micro-optic device of claim 20 wherein:
said soldering-enhancement end surface on one of two adjacent holders further includes a tapered corner with a sloped upper surface above said extending end surface for enhancing a melted solder alloy to flow to said soldering-enhancement end surface.

22. The in-line micro-optic device of claim 21 wherein:
said tapered corner with a slop upper surface above said extending end surface on one of said two adjacent holders having a slop upper surface with a tapered angle of about forty-five degrees above said extending end surface.

23. The in-line micro-optic device of claim 19 wherein:
said holders having a length of about 5 to 20 mm, an inside diameter of about 1.0 to 3.0 mm and an outside diameter of about 2.5 to 4.0 mm.

* * * * *